United States Patent
Lander et al.

(10) Patent No.: US 9,836,714 B2
(45) Date of Patent: Dec. 5, 2017

(54) SYSTEMS AND METHODS FOR DETERMINING COSTS OF VEHICLE REPAIRS AND TIMES TO MAJOR REPAIRS

(71) Applicant: TrueCar, Inc., Santa Monica, CA (US)

(72) Inventors: Joel Martin Lander, Santa Monica, CA (US); Mikhail Semeniuk, Golden Valley, MN (US); Michael D. Swinson, Santa Monica, CA (US)

(73) Assignee: TrueCar, Inc., Santa Monica, CA (US)

(*) Notice: Subject to any disclaimer, the term of this patent is extended or adjusted under 35 U.S.C. 154(b) by 597 days.

(21) Appl. No.: 14/137,228

(22) Filed: Dec. 20, 2013

(65) Prior Publication Data

US 2014/0279709 A1   Sep. 18, 2014

Related U.S. Application Data

(60) Provisional application No. 61/780,740, filed on Mar. 13, 2013.

(51) Int. Cl.
| | |
|---|---|
| *G06K 7/00* | (2006.01) |
| *G06Q 10/08* | (2012.01) |
| *G06Q 40/00* | (2012.01) |
| *G06Q 50/10* | (2012.01) |

(52) U.S. Cl.
CPC .......... *G06Q 10/08* (2013.01); *G06Q 40/00* (2013.01); *G06Q 50/10* (2013.01)

(58) Field of Classification Search
USPC ...................... 235/375, 383; 705/5, 7, 35–45
See application file for complete search history.

(56) References Cited

U.S. PATENT DOCUMENTS

| | | | |
|---|---|---|---|
| 5,774,873 | A | 6/1998 | Berent et al. |
| 5,940,816 | A | 8/1999 | Fuhrer |
| 6,006,201 | A | 12/1999 | Berent et al. |
| 7,660,758 | B2 | 2/2010 | Kwan |
| 8,589,212 | B2 | 11/2013 | Pollak et al. |
| 8,818,881 | B2 | 8/2014 | Himmerick et al. |
| 9,189,960 | B2 | 11/2015 | Couch et al. |
| 9,727,905 | B2 | 8/2017 | Swinson et al. |

(Continued)

OTHER PUBLICATIONS

Office Action for U.S. Appl. No. 14/137,194, mailed Dec. 9, 2015, 13 pgs.

(Continued)

*Primary Examiner* — Matthew Mikels
(74) *Attorney, Agent, or Firm* — Sprinkle IP Law Group

(57) ABSTRACT

Systems, methods and computer program products for determining costs of vehicle repairs and times to major repairs. In one embodiment, a system includes a computer processor, a data storage device, and an output device. The processor receives information from a user identifying a vehicle of interest. The processor retrieves repair data items that have characteristics common to the vehicle of interest from a database stored in the data storage device. The processor determines repairs that are expected to be necessary for the vehicle of interest based on the retrieved repair data items, and determines the costs associated with the identified expected repairs. The processor provides output to the user indicating the repair costs and/or the times at which the repairs are likely to be necessary. The output may be in graphical and/or numerical form.

21 Claims, 2 Drawing Sheets

(56) References Cited

U.S. PATENT DOCUMENTS

| | | | |
|---|---|---|---|
| 9,747,620 | B2 | 8/2017 | Swinson et al. |
| 2006/0178973 | A1 | 8/2006 | Chiovari et al. |
| 2006/0242089 | A1* | 10/2006 | Vahidi .................. G06Q 10/10 705/400 |
| 2007/0185777 | A1 | 8/2007 | Pyle et al. |
| 2009/0006118 | A1 | 1/2009 | Pollak |
| 2010/0088158 | A1 | 4/2010 | Pollak |
| 2010/0179704 | A1 | 7/2010 | Ozog |
| 2010/0274571 | A1 | 10/2010 | McFall et al. |
| 2010/0274631 | A1 | 10/2010 | McFall et al. |
| 2010/0299190 | A1 | 11/2010 | Pratt |
| 2011/0082759 | A1 | 4/2011 | Swinson |
| 2011/0119231 | A1 | 5/2011 | Namburu |
| 2011/0202471 | A1 | 8/2011 | Scott et al. |
| 2011/0231028 | A1 | 9/2011 | Ozog |
| 2012/0136802 | A1* | 5/2012 | McQuade .......... G06Q 30/0282 705/347 |
| 2012/0233014 | A1 | 9/2012 | Banks et al. |
| 2012/0284087 | A1 | 11/2012 | Pollak |
| 2012/0284113 | A1 | 11/2012 | Pollak |
| 2013/0066667 | A1 | 3/2013 | Gulec |
| 2013/0218724 | A1 | 8/2013 | Moretti et al. |
| 2014/0052328 | A1* | 2/2014 | Nguyen ............... G07C 5/0808 701/29.6 |
| 2014/0089208 | A1 | 3/2014 | Humble et al. |
| 2014/0229391 | A1 | 8/2014 | East, III et al. |
| 2014/0257934 | A1 | 9/2014 | Chrzan et al. |
| 2014/0258044 | A1 | 9/2014 | Chrzan et al. |
| 2014/0279020 | A1 | 9/2014 | Duguid et al. |
| 2014/0279229 | A1 | 9/2014 | Burgiss et al. |
| 2014/0279258 | A1 | 9/2014 | Swinson et al. |
| 2014/0279708 | A1 | 9/2014 | Swinson et al. |
| 2015/0058152 | A1 | 2/2015 | Pollak et al. |
| 2015/0206206 | A1 | 7/2015 | Puente et al. |
| 2015/0324737 | A1 | 11/2015 | Chrzan et al. |
| 2015/0324879 | A1 | 11/2015 | Lu et al. |

OTHER PUBLICATIONS

Office Action for U.S. Appl. No. 14/137,194, mailed Apr. 15, 2016, 13 pgs.

Office Action for U.S. Appl. No. 14/137,194, mailed Feb. 24, 2015, 19 pgs.

Office Action for U.S. Appl. No. 14/137,194, mailed Aug. 14, 2014, 17 pgs.

True Cost to Own (TCO), Calculator on Edmunds.com (recovered from Internet Archive Feb. 14, 2012), <http://www.edmunds.com/tco.html>, 4 pgs.

Office Action for U.S. Appl. No. 14/136,687, mailed Aug. 18, 2016, 12 pgs.

Notice of Allowance issued for U.S. Appl. No. 14/136,987, mailed Jan. 12, 2017, 7 pages.

Notice of Allowance issued for U.S. Appl. No. 14/137,194, dated Jun. 19, 2017, 7 pages.

Notice of Allowance issued for U.S. Appl. No. 14/136,687, dated Jul. 13, 2017, 7 pages.

Notice of Allowance issued for U.S. Appl. No. 14/137,194, dated Mar. 16, 2017, 6 pages.

Notice of Allowance issued for U.S. Appl. No. 14/136 687, dated Mar. 28, 2017, 6 pages.

* cited by examiner

SYSTEMS AND METHODS FOR DETERMINING COSTS OF VEHICLE REPAIRS AND TIMES TO MAJOR REPAIRS

CROSS-REFERENCE TO RELATED APPLICATION(S)

This application is a conversion of and claims a benefit of priority from U.S. Provisional Application No. 61/780,740, filed Mar. 13, 2013, entitled "SYSTEM AND METHOD FOR DETERMINING TIME TO FIRST MAJOR REPAIR," which is incorporated by reference, with all appendices and attachments thereto, as if set forth herein in its entirety.

BACKGROUND

Field of the Invention

The invention relates generally to cost analysis and more particularly to systems, methods and computer program products for analyzing and determining the expected costs to repair a vehicle.

Related Art

Consumers are periodically faced with the prospect of making decisions with respect to high-value items such as vehicles, and it is often the case that the consumers are not well equipped to make these decisions. For example, when considering whether to purchase or sell a vehicle, a consumer may be well aware of the price at which the vehicle may be bought or sold, but the value of the vehicle may be impacted by other factors that are less obvious. One of these factors is the expected cost to maintain or repair the vehicle. Frequently, a person who expects to incur major repair costs to maintain a currently owned vehicle will be motivated to purchase a new vehicle in order to avoid these costs. On the other hand, a person who is interested in purchasing a vehicle may be much less interested if he or she expects that the vehicle will require major repairs soon after it is purchased.

Unfortunately, expected repairs are often difficult to identify and quantify. Consumers often have only an anecdotal basis for determining whether they should expect major repair costs. For instance, the consumer may have heard rumors that vehicles manufactured by a particular car maker begin experiencing electrical problems when they are five years old, or may have transmission problems after 60,000 miles. At best, consumers may have access to information that manufacturers or others collect using relatively subjective survey methodologies. Ultimately, consumers may simply have to rely on their intuition or "hunches" in making decisions about whether to buy or sell vehicles.

It would therefore be desirable to provide tools that enable people (including consumers, dealers and others) to more accurately and objectively determine which repairs may be expected for a vehicle, and what the cost of those repairs will likely be.

SUMMARY OF THE INVENTION

This disclosure is directed to systems and methods for determining anticipated repairs for a vehicle and estimating the cost of those repairs. One particular embodiment comprises a system for determining costs of vehicle repairs and times to major repairs. This system includes a computer processor, a data storage device coupled to the processor, and an output device. The processor is configured to receive information from a user identifying a vehicle of interest. The system retrieves repair data items that have characteristics which are common to the vehicle of interest from a database stored in the data storage device. The repair data items are identified by characteristics that are common to the vehicle of interest, such as make, model, year, mileage, etc. If insufficient data is available for vehicles of the same make, model, etc, data for similar vehicles is retrieved. The system then determines, based on the retrieved repair data items, one or more repairs that are expected to be necessary for the vehicle of interest. The system then determines the costs associated with the identified expected repairs. Finally, the system provides an output indicating the repair costs and/or the times at which the repairs are likely to be necessary. The output may be provided, for example, in the form of a graph of the likelihood of a major repair as a function of time, or as a survival function. Alternatively, the system may determine a time in the future at which the likelihood of occurrence of a major repair (or cumulative repairs having a value equivalent to a major repair) reaches a threshold value. A major repair may be identified, for example, as a repair having an associated cost that is at least a predetermined percentage (e.g., 5% or 10%) of the vehicle's value (e.g., purchase price or depreciated value).

Another embodiment comprises a method for determining costs of vehicle repairs and times to major repairs. The method begins with receiving that identifies a user-specified vehicle of interest. Repair data items that are associated with characteristics of the vehicle of interest are then retrieved from a repair database that is stored in a data storage device. The characteristics may include such things as the make, model, year and mileage of the vehicle. If the data associated with these characteristics is sparse, data for similar vehicles may be grouped together. One or more repairs that are expected to be required for the vehicle of interest are identified from the retrieved information. The costs associated with the identified repairs are also determined from the retrieved data items. These costs may be used to identify major repairs (e.g., repairs that exceed 5% or 10% of the purchase price or depreciated price of the vehicle). Output is then provided to a user indicating the expected costs. This may include generating a graph showing a likelihood of occurrence of a major repair as a function of time, determining a time at which the likelihood of occurrence of a major repair is expected (e.g., the time at which the likelihood exceeds a predetermined threshold, such as 50%).

Another alternative embodiment comprises a computer program product. The computer program product consists of a set of computer instructions that are stored on a non-transitory computer-readable storage medium. The instructions are translatable by a processor to perform a method substantially as set forth above. Numerous other embodiments are also possible.

Embodiments of the invention may assist consumers in making decisions about their vehicles. More specifically, various embodiments provide new ways to identify expected repairs for particular vehicles based on historical repair information for vehicles having the same or similar characteristics. Embodiments of the invention may also take into account characteristics of the consumer (e.g., expected monthly mileage or driver demographics) in determining repair expectations. Further, embodiments may utilize the geographical location of the consumer to better estimate repair costs. Still further, embodiments of the invention may be presented to users in a manner that enables them to estimate the time at which major repairs are expected to be necessary.

The above embodiments and others will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

Other objects and advantages of the invention may become apparent upon reading the following detailed description and upon reference to the accompanying drawings.

Figure 1:
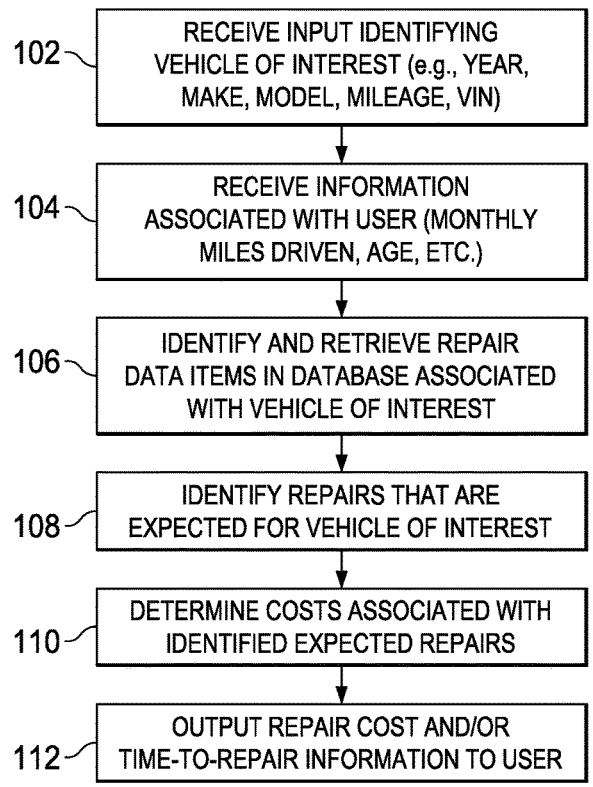
FIG. 1 is a flow diagram illustrating an exemplary embodiment of a method for determining the repairs that are expected to be made on a vehicle of interest, and the costs associated with those repairs.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the invention as defined by the appended claims. Further, the drawings may not be to scale, and may exaggerate one or more components in order to facilitate an understanding of the various features described herein.

DETAILED DESCRIPTION OF EXEMPLARY EMBODIMENTS

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk), hardware circuitry or the like, or any combination.

The various embodiments disclosed herein may provide a number of advantages over prior art systems and methods. For example, rather than relying on anecdotal information or subjective surveys, the present systems and methods utilize databases of actual repair information that enable the identification of actual costs associated with specific types of repairs on specific types of vehicles. If there is insufficient repair data associated with the specific vehicle of interest, repair data associated with other, similar types of vehicles can be combined so that expected repairs and associated costs can be identified for the vehicle of interest. The repair costs determined by the system may take into account the geographical location of the vehicle/owner by using repair data that is associated with that location. The repair costs may also take into account the owner's characteristics and demographics (e.g., using the monthly miles driven by the user, or adjusting the repairs based on the driver's age). The repair information may be used to generate various types of output for a user, such as a graph of the likelihood of a major repair as a function of time, or a more streamlined time-to-major-repair estimate (based on a predetermined likelihood of the repair).

Referring to FIG. 1, a flow diagram illustrating an exemplary embodiment of a method for determining the repairs that are expected to be made on a vehicle of interest, and the costs associated with those repairs is shown. In this embodiment, a system receives user input that identifies a vehicle of interest (102). The vehicle of interest may be identified in any of a number of ways, such as identifying a make, model and year for the vehicle. Alternatively, the user may provide the VIN (vehicle identification number) for the vehicle. Additionally, because the mileage of a vehicle may have a substantial impact on its expected repairs (e.g., a vehicle with 50,000 miles will typically be expected to incur greater repair costs than an identical vehicle with only 30,000 miles), the mileage may also be provided to the system. In this embodiment, the system may also receive information that is associated with the owner (or potential owner) of the vehicle (104). For instance, the user may input an estimated number of miles the vehicle is expected to be driven each month. Other information associated with the owner's demographics may also be used by the system in the determination of expected repairs. For example, if the driver is a 25 year-old male, the vehicle may be driven harder than if it were owned by a 60 year-old female, and may consequently be expected to require major repairs sooner.

Based on the received vehicle information, the system identifies and retrieves previously stored repair data items (e.g., entries in a repair database) that are associated with vehicles having the same or similar characteristics as the vehicle of interest (106). For instance, the retrieved data items may be associated with vehicles having the same year, make, model and mileage as the vehicle of interest. Because the system is attempting to determine repairs that are expected in the future, it may be desirable to identify and retrieve information associated with vehicles that are similar to the vehicle of interest in its expected state. For example, if the vehicle of interest is a new 2013 Toyota Camry, the repairs that are expected in three years will be repairs on a three-year-old (2010) Toyota Camry having approximately 36,000 miles.

The retrieved repair information is used to determine empirically the types of repairs that have actually been performed on vehicles that are similar to the vehicle of interest. The repair information may be evaluated in any of a variety of ways to determine the likelihood that a particular type of repair will be necessary for the vehicle of interest at some point in the future (108). Thus, if 50% of all Toyota Camry's have required a particular type of repair at 50,000 miles, it can be expected that there is a 50% chance that this repair will be required on the vehicle of interest (a Toyota Camry) in the time it takes to reach 50,000 miles. There may be a number of repairs that will be required over some span of time, and the likelihood of each of these different repairs may be determined. The likelihoods of these repairs may be determined as functions of time (with the likelihood increasing over time), or a likelihood may be determined for specific points in time or intervals of time.

When the specific repairs that are expected for the vehicle of interest have been determined, the cost associated with each of these repairs is determined (110). The cost is determined from the stored repair information. For instance, if a transmission overhaul is expected, the cost associated with transmission overhauls for vehicles of the same type as the vehicle of interest is determined from the stored repair data. The cost determination may take into account the location of the owner by calculating the average cost of the identified repair in the area local to the owner. The cost determination may also take into account such factors as the present value of money (e.g., by adjusting costs that are expected to be incurred in the future to current, inflation-adjusted dollars).

When the repairs that are expected for the vehicle of interest have been identified, and the costs associated with these repairs have been determined, the results can be output to a user (112). The results can be provided in a variety of ways, and may be indicative of costs and likelihoods that are associated with individual repairs, or that are associated with all of the expected repairs, cumulatively.

In one embodiment, the repair costs are used to identify "major" repairs. A major repair can be defined as desired, but may, for example, include repairs that exceed a predetermined percentage of the vehicle's value, such as 5% of the purchase price, or 10% of the depreciated value of the vehicle. The likelihood of a major repair is then presented to the user as a graph indicating the likelihood as a function of time. In another embodiment, the likelihood of a major repair as a function of time may be used internally to identify a time-to-major-repair. The time-to-major-repair may be defined in this embodiment as a number of months at which the likelihood of a major repair begins to exceed a threshold percentage (e.g., 50%).

Figure 2:
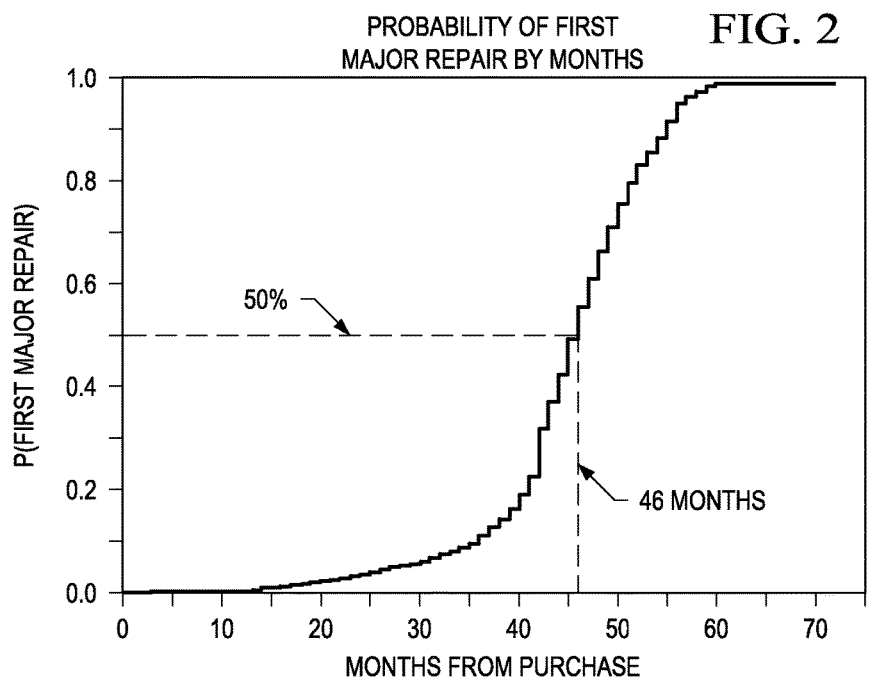
FIG. 2 is a graph of the likelihood of a major repair as a function of time which is output in an exemplary embodiment.

Referring to FIG. 2, an exemplary output of the system in one embodiment is shown. In this embodiment, the system generates a graph illustrating the probability, as a function of time, that a vehicle of interest will require a major repair. In this embodiment, a major repair is one that exceeds either 5% of the vehicle's purchase price or 10% or the vehicle's depreciated price. The graph shows that the probability of a major repair is initially low (around 0%), and remains low (below 10%) for the first 25-30 months, as might be expected for a relatively new vehicle. After 35-40 months, the probability of a major repair begins to rise more rapidly. In this particular instance, the probability of a major repair reaches 50% at about 46 months.

If the user is considering purchasing the vehicle, this information can be used to help visualize the actual cost of owning the vehicle over time (since the cost of ownership include not only the purchase price, but the cost to drive, maintain and repair the vehicle). If the user already owns the vehicle, the graph of FIG. 2 may be used as a tool to determine how long the owner should keep the vehicle. If a major repair is not expected for 24 months, it may not be a concern for the user. If, on the other hand, a major repair is expected within the next year, the owner may wish to start looking for a new vehicle in order to avoid the cost associated with the major repair.

As noted above, the system may provide various alternative outputs, such an estimated time-to-major-repair. This time-to-major-repair may, for instance, be determined from the information in the graph of FIG. 2. If it is assumed that a major repair will be necessary when the probability of the repair reaches (meets or exceeds) 50%, the system can simply determine the number of months at which the graph crosses the 50% threshold, and provide this value to the user. In the specific example of FIG. 2, the graph crosses the 50% threshold at approximately 46 months. In alternative embodiments, the threshold probability may be set at different levels by either the system administrator or the user. The estimated time-to-major-repair can also be provided as a range of times, such as the range corresponding to 50%-80% probability of occurrence of the major repair (46-52 months in the figure).

Figure 3:
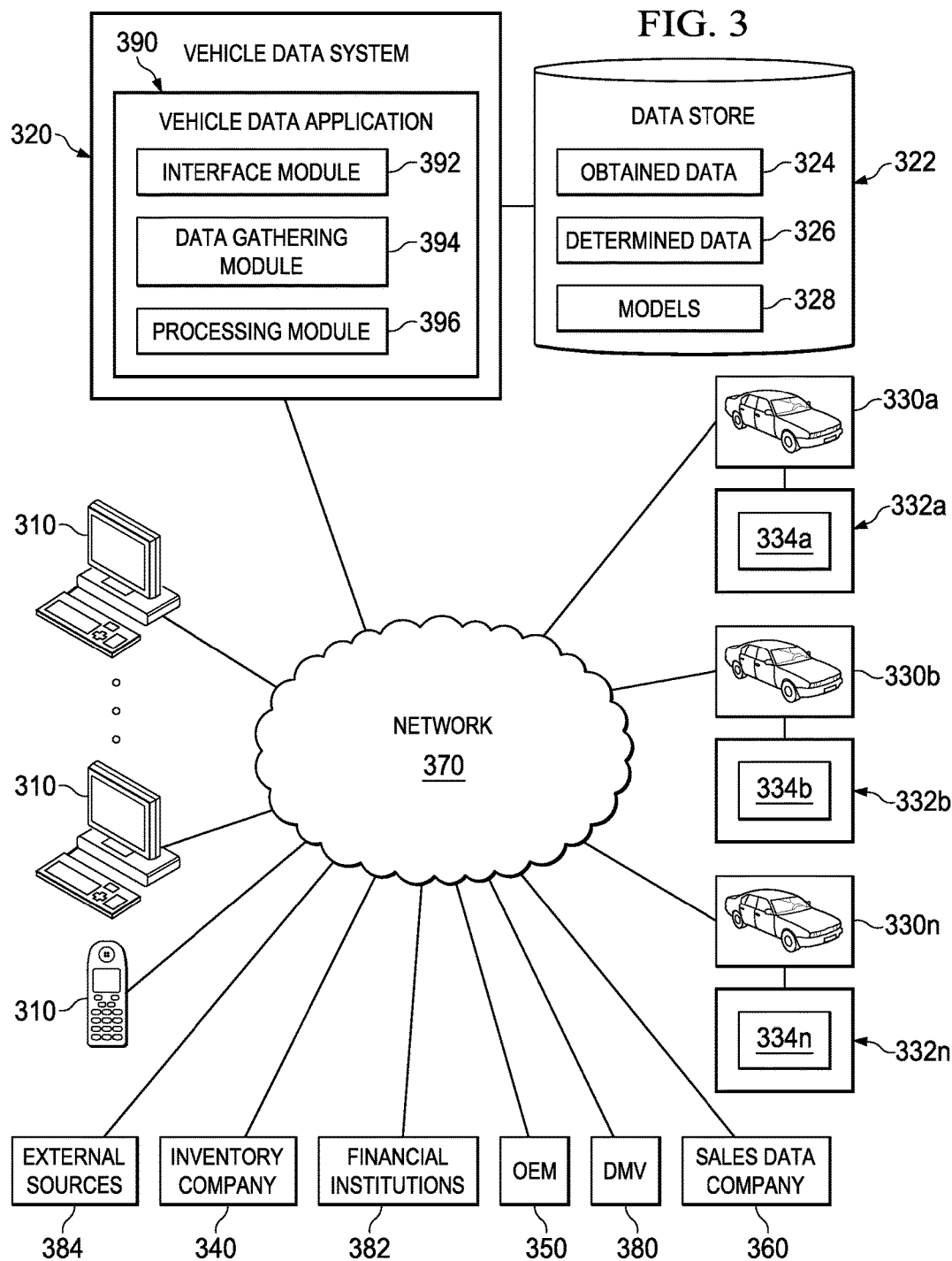
FIG. 3 is a diagram illustrating an exemplary topology which may be used to implement embodiments disclosed herein.

The various embodiments of the recommendation systems disclosed herein can be implemented in hardware systems having many different topologies. FIG. 3 depicts one particular topology which may be used to implement embodiments of the systems and methods disclosed herein. Topology 300 comprises a set of entities including vehicle data system 320 which is coupled through network 370 to computing devices 310 (e.g., computer systems, personal data assistants, kiosks, dedicated terminals, mobile telephones, smart phones, etc.), and one or more computing devices at inventory companies 340, original equipment manufacturers (OEM) 350, sales data companies 360, financial institutions 382, external information sources 384, departments of motor vehicles (DMV) 380 and one or more associated point of sale locations, in this embodiment, car dealers 330. Computing devices 310 may be used by consumers while conducting a search for consumer goods and/or services, such as automobiles. Network 370 may be for example, a wireless or wired communication network such as the Internet or wide area network (WAN), publicly switched telephone network (PTSN) or any other type of electronic or non-electronic communication link such as mail, courier services or the like.

Vehicle data system 320 may comprise one or more computer systems with central processing units executing instructions embodied on one or more computer readable media where the instructions are configured to perform at least some of the functionality associated with embodiments disclosed herein. These applications may include a vehicle data application 390 comprising one or more applications (instructions embodied on one or more non-transitory computer readable media) configured to implement an interface module 392, data gathering module 394 and processing module 396 utilized by the vehicle data system 320. Furthermore, vehicle data system 320 may include data store 322 operable to store obtained data 324, data 326 determined during operation, models 328 which may comprise a set of dealer cost model or price ratio models, or any other type of data associated with embodiments disclosed herein or determined during the implementation of those embodiments.

Vehicle data system 320 may provide a wide degree of functionality, including utilizing one or more interfaces 392 configured to, for example, receive and respond to queries from users at computing devices 310; interface with inventory companies 340, manufacturers 350, sales data companies 360, financial institutions 382, DMVs 380 or dealers 330 to obtain data; or provide data obtained, or determined, by vehicle data system 320 to any of inventory companies 340, manufacturers 350, sales data companies 360, financial institutions 382, DMVs 380, external data sources 384 or dealers 330. It will be understood that the particular interface 392 utilized in a given context may depend on the functionality being implemented by vehicle data system 320, the type of network 370 utilized to communicate with any particular entity, the type of data to be obtained or presented, the time interval at which data is obtained from the entities, the types of systems utilized at the various entities, etc. Thus, these interfaces may include, for example, web pages, web services, a data entry or database application to which data can be entered or otherwise accessed by an operator, or almost any other type of interface which it is desired to utilize in a particular context.

In general, then, using these interfaces 392 vehicle data system 320 may obtain data from a variety of sources, including one or more of inventory companies 340, manufacturers 350, sales data companies 360, financial institutions 382, DMVs 380, external data sources 384 or dealers 330 and store such data in data store 322. This data may be then grouped, analyzed or otherwise processed by vehicle data system 320 to determine desired data 326 or models 328 which are also stored in data store 322.

A user at computing device 310 may access the vehicle data system 320 through the provided interfaces 392 and specify certain parameters, such as a desired vehicle configuration or incentive data the user wishes to apply, if any. The vehicle data system 320 can select a particular set of data in the data store 322 based on the user specified parameters, process the set of data using processing module 396 and models 328, generate interfaces using interface module 392 using the selected data set on the computing devices 310 and data determined from the processing, and present these interfaces to the user at the user's computing device 310. Interfaces 392 may visually present the selected data set to the user in a highly intuitive and useful manner.

A visual interface may present at least a portion of the selected data set as a price curve, bar chart, histogram, etc. that reflects quantifiable prices or price ranges (e.g., "average," "good," "great," "overpriced," etc.) relative to reference pricing data points (e.g., invoice price, MSRP, dealer cost, market average, internet average, etc.). Using these types of visual presentations may enable a user to better understand the pricing data related to a specific vehicle configuration. Additionally, by presenting data corresponding to different vehicle configurations in a substantially identical manner, a user can easily make comparisons between pricing data associated with different vehicle configurations. To further aid the understanding for a user of the presented data, the interface may also present data related to incentives which were utilized to determine the presented data or how such incentives were applied to determine presented data.

Turning to the various other entities in topology 300, dealer 330 may be a retail outlet for consumer goods and/or services, such as vehicles manufactured by one or more of OEMs 350. To track or otherwise manage sales, finance, parts, service, inventory and back office administration needs dealers 330 may employ a dealer management system (DMS) 332. Since many DMS 332 are Active Server Pages (ASP) based, transaction data 334 may be obtained directly from the DMS 332 with a "key" (for example, an ID and Password with set permissions within the DMS system 332) that enables data to be retrieved from the DMS system 332. Many dealers 330 may also have one or more web sites which may be accessed over network 370, where pricing data pertinent to the dealer 330 may be presented on those web sites, including any pre-determined, or upfront, pricing. This price is typically the "no haggle" price (i.e., price with no negotiation) and may be deemed a "fair" price by vehicle data system 320.

Inventory companies 340 may be one or more inventory polling companies, inventory management companies or listing aggregators which may obtain and store inventory data from one or more of dealers 330 (for example, obtaining such data from DMS 332). Inventory polling companies are typically commissioned by the dealer to pull data from a DMS 332 and format the data for use on websites and by other systems. Inventory management companies manually upload inventory information (photos, description, specifications) on behalf of the dealer. Listing aggregators get their data by "scraping" or "spidering" websites that display inventory content and receiving direct feeds from listing websites (for example, AutoTrader.com, FordVehicles.com, etc.).

DMVs 380 may collectively include any type of government entity to which a user provides data related to a vehicle. For example, when a user purchases a vehicle it must be registered with the state (for example, DMV, Secretary of State, etc.) for tax and titling purposes. This data typically includes vehicle attributes (for example, model year, make, model, mileage, etc.) and sales transaction prices for tax purposes.

Financial institution 382 may be any entity such as a bank, savings and loan, credit union, etc. that provides any type of financial services to a participant involved in the purchase of a vehicle. For example, when a buyer purchases a vehicle they may utilize a loan from a financial institution, where the loan process usually requires two steps: applying for the loan and contracting the loan. These two steps may utilize vehicle and consumer information in order for the financial institution to properly assess and understand the risk profile of the loan. Typically, both the loan application and loan agreement include proposed and actual sales prices of the vehicle.

Sales data companies 360 may include any entities that collect any type of vehicle sales data. For example, syndicated sales data companies aggregate new and used sales transaction data from DMS 332 systems of particular dealers 330. These companies may have formal agreements with dealers 330 that enable them to retrieve data from dealer 330 in order to syndicate the collected data for the purposes of internal analysis or external purchase of the data by other data companies, dealers, and OEMs.

Manufacturers 350 can be those entities which actually build the vehicles sold by dealers 330. To guide the pricing of their vehicles, manufacturers 350 may provide an Invoice price and a Manufacturer's Suggested Retail Price (MSRP) for both vehicles and options for those vehicles—to be used as general guidelines for the dealer's cost and price. These fixed prices are set by the manufacturer and may vary slightly by geographic region.

External information sources 384 may comprise any number of other various source, online or otherwise, which may provide other types of desired data, for example data regarding vehicles, pricing, demographics, economic conditions, markets, locale(s), consumers, etc.

It should be noted here that not all of the various entities depicted in topology 300 are necessary, or even desired, in embodiments disclosed herein, and that certain of the functionality described with respect to the entities depicted in topology 300 may be combined into a single entity or eliminated altogether. Additionally, in some embodiments other data sources not shown in topology 300 may be utilized. Topology 300 is therefore exemplary only and should in no way be taken as imposing any limitations on embodiments disclosed herein.

A more detailed description of calculations that may be used in one embodiment to determine maintenance and repair costs described below. These computations, $M_{t,\phi,i,m}$, can be quite involved, but they are based on historical repair data that may be obtained from one or more external sources. These sources may include repair facilities (e.g., at car dealerships), third-party data aggregators or other sources. The repair data reflects actual repairs and vehicle maintenance that are performed by various repair facilities. The data may identify such information as the specific repair item, costs for parts and labor, year, make and model of the repaired vehicle, mileage of the repaired vehicle, etc. This information is used by the system to group the repair information into bins that can be associated with vehicles having corresponding characteristics. These bins of data can then be used to predict the repairs that are likely to be necessary for the associated vehicles. The data is also used to identify costs associated with the expected repairs. The likelihood of repair and cost information is presented to the user to assist the user in determining whether to buy/sell the vehicle.

In one embodiment, Expected repair costs=(Expected # repairs)(Expected repair cost for each repair). Stated more formally:

$$c_{i,t} = \sum_{\mu} (E[R_{\mu,i,t}]E[c_{\mu,i,t} | R_{\mu,i,t}])$$

(Expected # repairs)=$E[R_{\mu,i,t}]$ can be generated by evaluating
E[#repairs per vehicle] using the following exemplary methodology:
1. Bins for each YMM (and mileage per year factors) are generated. The most recent relevant data is used by year to represent the YMM in future years. Two approaches that can be taken:
   YMM(t)=(Y−t)MM(0), where YMM(t) is the Year, Make, Model that the practitioner is looking to compute for in year t, t∈1, 2, 3, . . . .
   The practitioner could also filter for vehicles with similar mileage per year characteristics: YMMm(t)=(Y−t)MMm(0)
2. Total number of unique vehicles serviced over a duration by YMM is counted.
3. Total number of unique vehicles by YMM on road over duration is estimated.
   This estimate can be generated by taking total # sales of vehicles by YMM (when new).
   Note that the practitioner could also generate a shelving factor that takes a certain portion of those vehicles out of circulation by time, but this is likely unnecessary for the duration over which the cost of ownership will be applied.
4. The ratio of the # vehicles with any maintenance or repair services to the total number of vehicles on the road (#2) can be created to generate a coverage index, $Ø_{i,b}$, for vehicle i, brand b.
5. The factor, percent servicing not reported, $\partial_{i,\mu}$, is constructed. It can be done for each individual repair item μ. This can be a heuristic measure assigned by the practitioner, or leverage external sources. One example source may be Kelton Research for Honeywell which conducts surveys and provides data that could be used for these factors. For examples of data that could be used for these factors, readers are directed to Charles Plueddeman, "Auto Repair: Do It Yourself, but Do It Right," [downloaded from <http://editorial.autos.msn.com/listarticle.aspx?cp-documentid=1088044&page=0 on Mar. 13, 2013], 4 pages, which is incorporated by reference herein in its entirety, and "Honeywell Survey Finds Majority of Americans Taking Car Care Into Their Own Hands," PR Newswire, United Business Media, [downloaded from <http://www.prnewswire.com/news-releases/honeywell-survey-finds-majority-of-americans-taking-car-care-into-their-own-hands-62073502.html on Mar. 13, 2013], 2 pages, which is incorporated by reference herein in its entirety. Note that for major repair items, it might be expected that $\partial_{i,\mu}$ approaches 0%, whereas for unscheduled, minor repairs, it might be a bit higher.
6. Assuming a matrix of vehicle repairs in our database and values of $\partial_{i,\mu}$, a for each vehicle bin i, take for each time duration t and constructed like bin of vehicles, $\max_i[R_{ij}/(1-\partial_{i,j})]=N_i$, $Ø_i=N_i/s_i$, where $s_i$=total # of sales for vehicle i during that duration of time. Letting j=μ as an index across all repairs in the database, we have the following:

$$\{\partial_{i,j}\} = \begin{pmatrix} \partial_{11} & \cdots & \partial_{1j} \\ \vdots & \ddots & \vdots \\ \partial_{i1} & \cdots & \partial_{ij} \end{pmatrix},$$

$$\{R_{i,j}\} = \begin{pmatrix} R_{11} & \cdots & R_{1j} \\ \vdots & \ddots & \vdots \\ R_{i1} & \cdots & R_{ij} \end{pmatrix},$$

$Ø_i=N_i/s_i$, where $s_i$=total # of sales for vehicle i during that duration of time. This effectively handles much of the sparse data issue and provides a reasonable estimate for repair vehicle coverage in the database. This overall coverage metric can then be used in the next step to scale each of the individual estimate repairs per vehicle.
7. This combination of the coverage index and the self-servicing data is then used to construct the E[#repairs per vehicle]
   E[#repairs per vehicle] for routine maintenance can be generated from manufacturer website owner's manuals. So, for any given routine maintenance item, the E[#repairs per vehicle] can be computed by taking the mileage driven over that duration divided by mileage frequency of suggested repairs.
   For major or unscheduled repairs, the practitioner would compute as follows:
   i. Step 1: construct bin of like vehicles on which to calculate
   ii. Step 2: compute frequency of a particular repair in the dataset
   iii. Step 3: scale frequency by coverage and E[#repairs per vehicle and repair type]=num repairs/
      (1−delta)*coverage or stated more formally:

$E[\text{\#repairs per vehicle and repair type}]=R_{\mu,i,t}/((1-\partial_{i,\mu,t})Ø_{i,t})$ The E[repair cost|repair]=$E[c_{\mu,i,m,t}|R_{\mu,i,t}]$ can be computed as follows:
   Step 1: Review manufacturer warranty info to ensure repairs (& maintenance) are correctly categorized. For those items under warranty, the practitioner will want to zero out costs in the cost of ownership computation.
   Step 2: Repairs not under warranty. Compute historical average costs for repairs of that type, $c_{i,\mu,m,t}$, for repairs in time t for vehicles with similar mileage driving habits. This must be done at the bin level and should be using the most recent data available.

Step 3: Construct maintenance inflation rate factors: Leveraging historical repair data, the average annual maintenance inflation rate factor can be calculated:

$$r_{i,\mu} = 1 - \frac{1}{T_i}\sum_{t_i=1}^{T_i}\left(\frac{c_{i,\mu,m,t+1}}{c_{i,\mu,m,t}}\right),$$

where c is average repair cost. Note that with sparse data, the embodiment could be modified to compute this factor at the brand level and/or repair-type level.

Step 4: $E[c_{\mu,i,m,t}|R_{\mu,i,t}]=(1+r_{i,\mu})^t c_{i,\mu,m,t'}$ in which historical data can be used to project costs ahead.

Finally, the Expected Repair Costs=

E[Number of repairs per vehicle]*$E[R_{i,\mu,m,t}|$repair] can be determined. Or stated more formally:

$$c_{\mu,i,t}=E[R_{\mu,i,t}]E[c_{\mu,i,t}|R_{\mu,i,t}]$$

Note that the subscript m is being treated loosely as the practitioner can choose the level of granularity on which to apply these calculations: at either the vehicle level i or the vehicle-mileage level i,m Summing this up over all repair types per vehicle, we get:

$$c_{i,t} = \sum_\mu (E[R_{\mu,i,t}]E[c_{\mu,i,t}|R_{\mu,i,t}])$$

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used, individually or in conjunction with another programming language, to implement the routines, methods or programs of embodiments of the invention described herein, including C, C++, Java, JavaScript, HTML, or any other programming or scripting language, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

The benefits and advantages which may be provided by the invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A system for determining costs of vehicle repairs and times to major repairs, the system comprising:
   a computer processor;
   a data storage device coupled to the computer processor; and
   an output device coupled to the computer processor;
   wherein the computer processor:
      receives, over a network from a computing device associated with a user, vehicle information identifying a user-specified vehicle of interest to the user;
      retrieves one or more repair data items from a repair database stored in the data storage device, wherein the repair data items are associated with vehicles having same or similar vehicle characteristics as the user-specified vehicle of interest to the user;
      determines, based on the retrieved one or more repair data items, one or more expected specific repairs associated with the user-specified vehicle of interest;
      determines, based on the one or more expected specific repairs determined by the computer processor for the user-specified vehicle of interest and utilizing stored repair information associated with the retrieved one or more repair data items, costs associated with the one or more expected repairs on the user-specified vehicle of interest; and
      provides an output over the network to the computing device associated with the user, wherein the output provides an indication of the one or more expected repair costs associated with the user-specified vehicle of interest, wherein the indication of the one or more expected repair costs associated with the user-specified vehicle of interest comprises a graph of a likelihood of occurrence of a major repair as a function of time, wherein the graph indicates a cumulative likelihood of occurrence of a plurality of potential major repairs and a time-to-major-repair.

2. The system of claim 1, wherein the retrieved one or more repair data items are associated with vehicles that have the same make and model as the user-specified vehicle of interest.

3. The system of claim 1, wherein the retrieved one or more repair data items are associated with vehicles that have one or more makes and models that are different from the user-specified vehicle of interest, wherein the computer processor groups the repair data items which are associated with vehicles having different makes and models from the user-specified vehicle of interest in response to determining that there is a sparsity of repair data items associated with the make and model of the user-specified vehicle of interest.

4. The system of claim 1, wherein the computer processor determines a value of the user-specified vehicle of interest and identifies a major repair as a repair having an associated cost that exceeds a predetermined percentage of the value of the vehicle of interest, wherein the value of the vehicle of interest comprises a purchase price of the vehicle of interest.

5. The system of claim 1, wherein the computer processor determines a value of the user-specified vehicle of interest and identifies a major repair as a repair having an associated cost that exceeds a predetermined percentage of the value of the user-specified vehicle of interest, wherein the value of the user-specified vehicle of interest comprises a depreciated price of the user-specified vehicle of interest, wherein the computer processor is configured to compute the depreciated price.

6. The system of claim 1, wherein the time-to-major-repair represents a time at which a likelihood of occurrence of a major repair reaches a threshold likelihood value.

7. A computer program product comprising at least one non-transitory computer-readable storage medium storing computer instructions that are translatable by a computer processor to perform:
   receiving, over a network from a computing device associated with a user, vehicle information identifying a user-specified vehicle of interest to the user;
   retrieving one or more repair data items from a repair database stored in a data storage device, wherein the repair data items are associated with vehicles having same or similar characteristics as the user-specified vehicle of interest to the user;
   determining, based on the retrieved one or more repair data items, one or more expected specific repairs associated with the user-specified vehicle of interest;
   determining, based on the one or more expected specific repairs determined by the computer processor for the user-specified vehicle of interest and utilizing stored repair information associated with the retrieved one or more repair data items, costs associated with the one or more expected repairs on the user-specified vehicle of interest; and
   providing an output over the network to the computing device associated with the user, wherein the output provides an indication of the one or more expected repair costs associated with the user-specified vehicle of interest, wherein the indication of the one or more expected repair costs associated with the user-specified vehicle of interest comprises a graph of a likelihood of occurrence of a major repair as a function of time, wherein the graph indicates a cumulative likelihood of occurrence of a plurality of potential major repairs and a time-to-major-repair.

8. The computer program product of claim 7, wherein the retrieved one or more repair data items are associated with vehicles that have the same make and model as the user-specified vehicle of interest.

9. The computer program product of claim 7, wherein the retrieved one or more repair data items are associated with vehicles that have one or more makes and models that are different from the user-specified vehicle of interest, wherein the method further comprises grouping the repair data items associated with vehicles having different makes and models from the user-specified vehicle of interest in response to determining that there is a sparsity of repair data items associated with the make and model of the user-specified vehicle of interest.

10. The computer program product of claim 7, further comprising determining a value of the user-specified vehicle of interest and identifying a major repair as a repair having an associated cost that exceeds a predetermined percentage of the value of the user-specified vehicle of interest, wherein the value of the user-specified vehicle of interest comprises a purchase price of the user-specified vehicle of interest.

11. The computer program product of claim 7, further comprising determining a value of the user-specified vehicle of interest and identifying a major repair as a repair having an associated cost that exceeds a predetermined percentage of the value of the user-specified vehicle of interest, wherein the value of the user-specified vehicle of interest comprises a depreciated price of the user-specified vehicle of interest, wherein the processor is configured to compute the depreciated price.

12. The computer program product of claim 7, wherein the time-to-major-repair represents a time at which a likelihood of occurrence of a major repair reaches a threshold likelihood value.

13. A method for determining costs of vehicle repairs and times to major repairs, the method comprising:
  receiving, by a server over a network from a computing device associated with a user, vehicle information identifying a user-specified vehicle of interest to the user;
  retrieving, by the server, one or more repair data items from a repair database stored in a data storage device, wherein the repair data items are associated with vehicles having same or similar vehicle characteristics as the user-specified vehicle of interest to the user;
  determining, by the server, based on the retrieved one or more repair data items, one or more expected specific repairs associated with the user-specified vehicle of interest;
  determining, by the server, based on the one or more expected specific repairs determined by the computer processor for the user-specified vehicle of interest and utilizing stored repair information associated with the retrieved one or more repair data items, costs associated with the one or more expected repairs on the user-specified vehicle of interest; and
  providing, by the server over the network, to the computing device associated with the user an output to a user, device, wherein the output provides an indication of the one or more expected repair costs associated with the user-specified vehicle of interest, wherein the indication of the one or more expected repair costs associated with the user-specified vehicle of interest comprises a graph of a likelihood of occurrence of a major repair as a function of time, wherein the graph indicates a cumulative likelihood of occurrence of a plurality of potential major repairs and a time-to-major-repair.

14. The method of claim 13, wherein the retrieved one or more repair data items are associated with vehicles that have the same make and model as the user-specified vehicle of interest.

15. The method of claim 13, wherein the retrieved one or more repair data items are associated with vehicles that have one or more makes and models that are different from the user-specified vehicle of interest, wherein the method further comprises grouping the repair data items associated with vehicles having different makes and models from the user-specified vehicle of interest in response to determining that there is a sparsity of repair data items associated with the make and model of the user-specified vehicle of interest.

16. The method of claim 13, further comprising determining a value of the user-specified vehicle of interest and identifying a major repair as a repair having an associated cost that exceeds a predetermined percentage of the value of the user-specified vehicle of interest, wherein the value of the user-specified vehicle of interest comprises a purchase price of the user-specified vehicle of interest.

17. The method of claim 13, further comprising determining a value of the user-specified vehicle of interest and identifying a major repair as a repair having an associated cost that exceeds a predetermined percentage of the value of the user-specified vehicle of interest, wherein the value of the user-specified vehicle of interest comprises a depreciated price of the user-specified vehicle of interest, wherein the processor is configured to compute the depreciated price.

18. The method of claim 13, wherein the time-to-major-repair represents a time at which a likelihood of occurrence of a major repair reaches a threshold likelihood value.

19. The system of claim 1, wherein the computer processor determines costs associated with the one or more expected repairs on the user-specified vehicle of interest by applying a function to stored repair information associated with the retrieved one or more repair data items, the stored repair information including cost data.

20. The computer program product of claim 7, further comprising determining costs associated with the one or more expected repairs on the user-specified vehicle of interest by applying a function to stored repair information associated with the retrieved one or more repair data items, the stored repair information including cost data.

21. The method of claim 13, wherein the server determines costs associated with the one or more expected repairs on the user-specified vehicle of interest by applying a function to stored repair information associated with the retrieved one or more repair data items, the stored repair information including cost data.

* * * * *